No. 729,531. PATENTED JUNE 2, 1903.
J. J. BERRIGAN.
CENTRIFUGAL LIQUID SEPARATOR.
APPLICATION FILED JAN. 2, 1900.
NO MODEL. 3 SHEETS—SHEET 1.
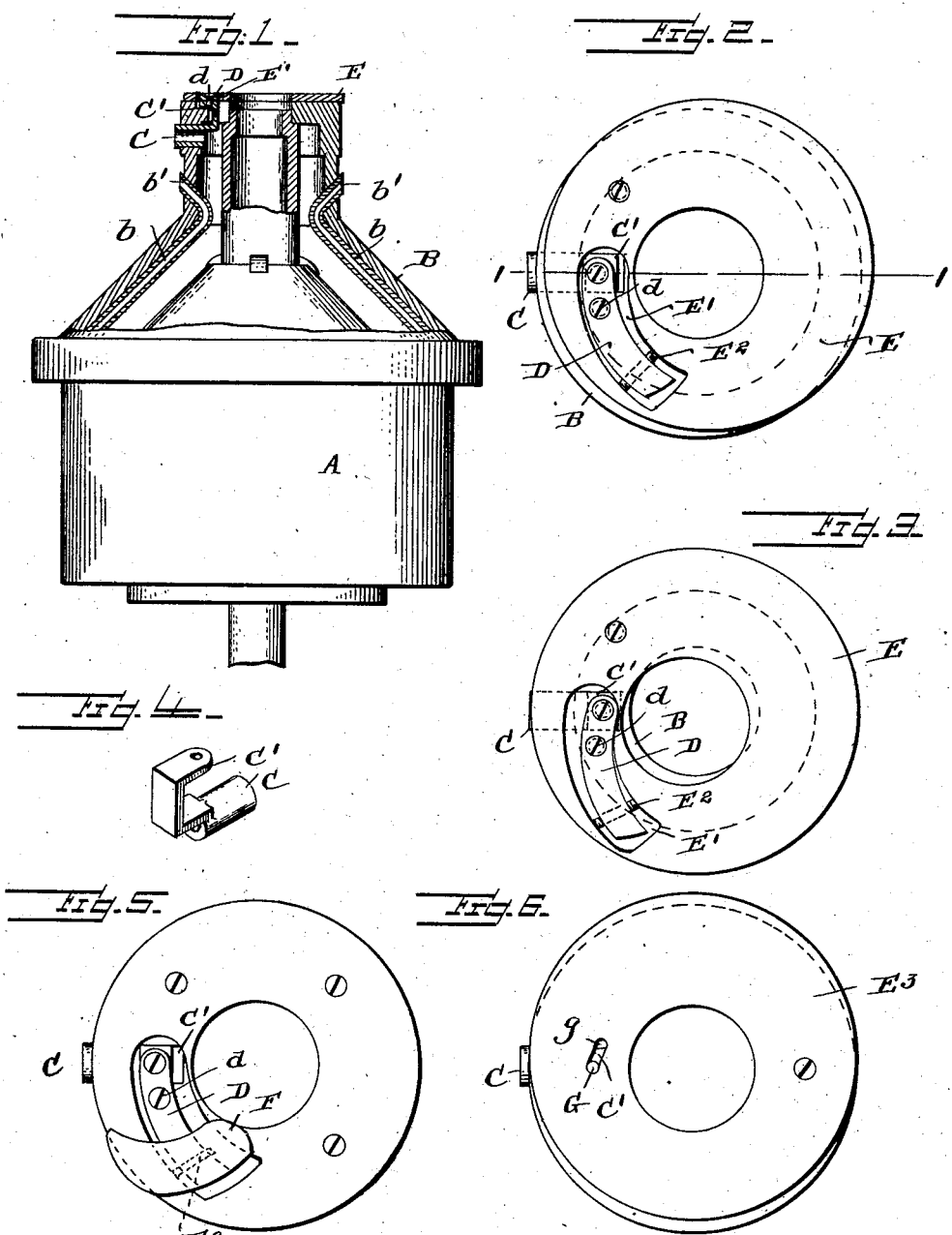
Witnesses. Inventor.

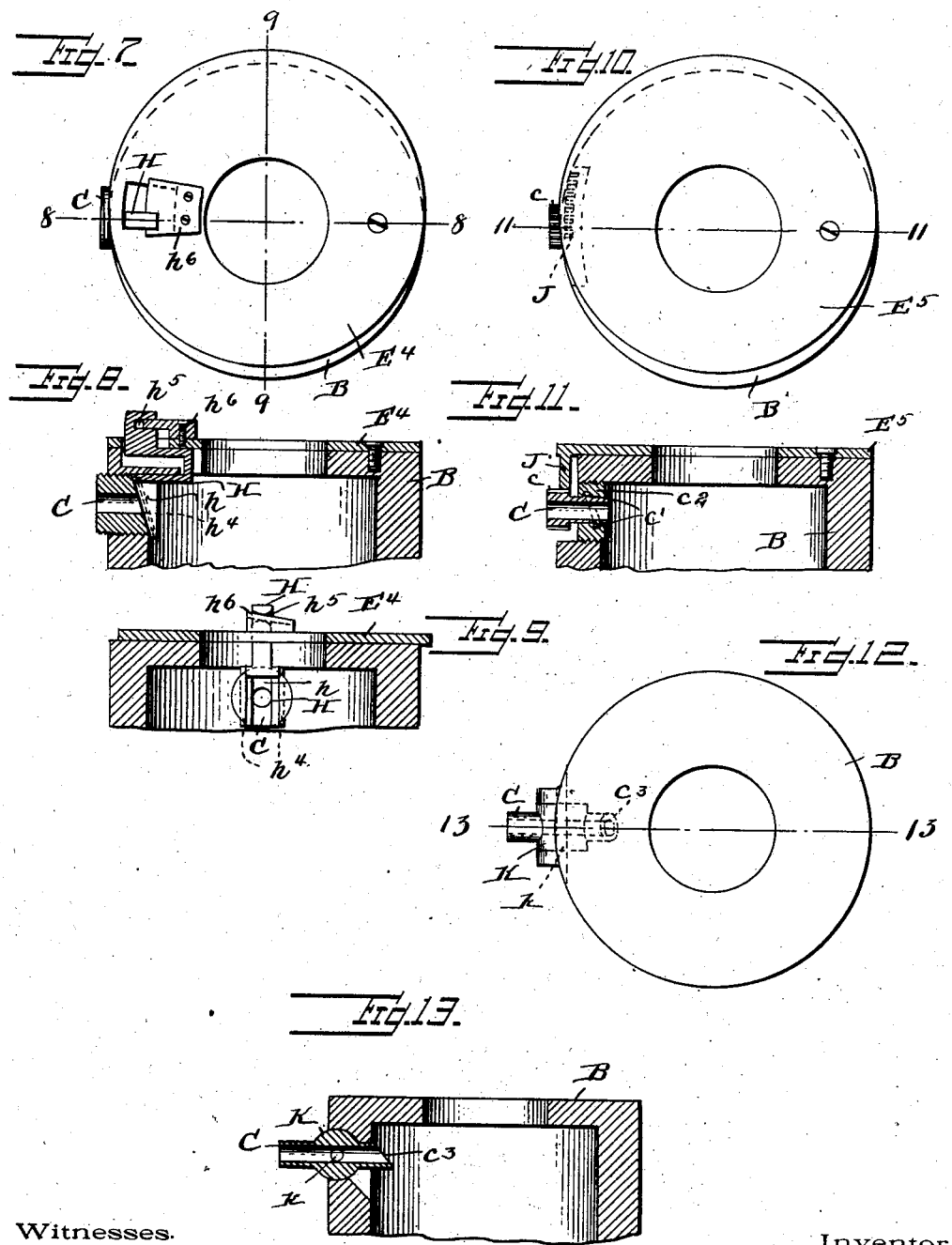

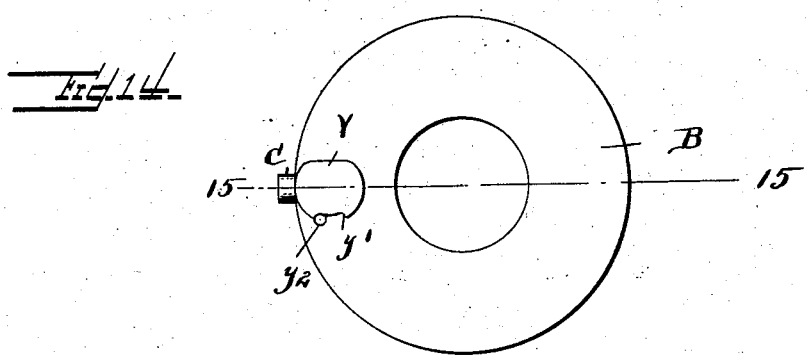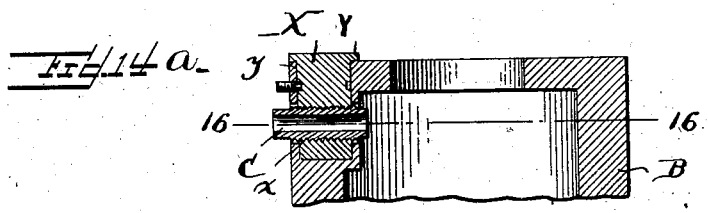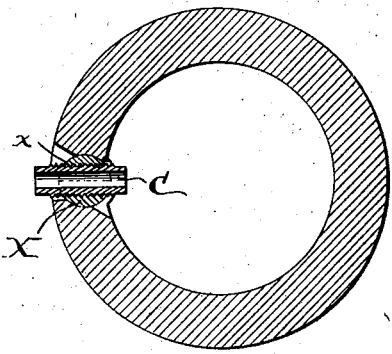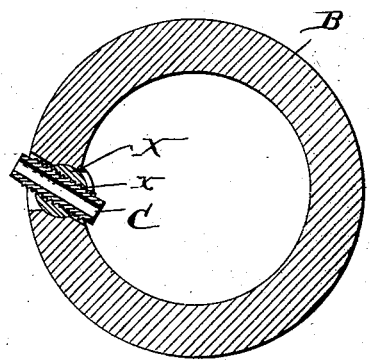

No. 729,531. Patented June 2, 1903.

UNITED STATES PATENT OFFICE.

JOHN JOSEPH BERRIGAN, OF AVON, NEW YORK, ASSIGNOR TO THE DE LAVAL SEPARATOR COMPANY, A CORPORATION OF NEW JERSEY.

CENTRIFUGAL LIQUID-SEPARATOR.

SPECIFICATION forming part of Letters Patent No. 729,531, dated June 2, 1903.

Application filed January 2, 1900. Serial No. 8. (No model.)

*To all whom it may concern:*

Be it known that I, JOHN JOSEPH BERRIGAN, a citizen of the United States, residing at Avon, county of Livingston, and State of New York, have invented a new and useful Improvement in Centrifugal Liquid-Separators, of which the following is a full, clear, and exact description, reference being had to the accompanying drawings, which form a part of this specification.

My invention is particularly adapted for use with that class of liquid-separators in which the liquid acted upon is milk and which is separated into its constituent elements—skim-milk and cream. In this class of machines as now operated the outlet for the cream rotating with the bowl is adjusted preliminarily to starting the machine to produce cream of the desired thickness. After the machine has been started and while in operation it is impossible under the present constructions to change this condition, the cream of a given specific gravity or thickness being delivered continuously. In order to make any changes, it is necessary to stop the machine and when stopped to readjust the cream-outlet.

The object of my invention is to provide a construction which will enable the operator without stopping the machine to so adjust the discharge device for the skim-milk or cream, or both, as to regulate the specific gravity of the liquids discharged.

The invention consists of the combination, with a discharge device adapted by adjustment to regulate the specific gravity of the liquid discharged, of a movable operating device adapted by its movement to control the movement of the discharge-regulating device, said operating device extending exterior to the bowl and adapted to be moved when in the rotation of the bowl it strikes an obstruction placed by the operator in the path of travel.

In the specific embodiment of the invention shown and described the discharge-regulating device consists of a device adapted when adjusted to vary the radial position of the discharge device.

My invention can be carried out by a number of different mechanical constructions, some of which I have set out in the accompanying drawings, in which—

Figure 1 is a view of the bowl and discharge-cover and cream-discharge orifice, partially in section, on the line 1 1 of Fig. 2. Fig. 2 is a plan view of the top of the cover. Fig. 3 is a view similar to Fig. 2, showing the cream-outlet in a different position from that of Fig. 2. Fig. 4 is a perspective view of the cream-discharge outlet. Fig. 5 is a plan view of the cover, showing a modified arrangement for moving the cream-discharge outlet-pipe. Fig. 6 is view similar to Fig. 5, showing another modified construction for varying the cream-discharge pipe. Fig. 7 is a plan view similar to Fig. 6, showing another arrangement for varying the position of the cream-outlet. Fig. 8 is a section on the line 8 8 of Fig. 7. Fig. 9 is a section on the line 9 9 of Fig. 7. Fig. 10 is a plan view of another arrangement for varying the position of the cream-outlet. Fig. 11 is a section on the line 11 11 of Fig. 10. Fig. 12 is a plan view of another arrangement for varying the position of the cream-outlet. Fig. 13 is a section on the line 13 13 of Fig. 12. Fig. 14 is a plan view of another arrangement for varying the position of the cream-outlet. Fig. 14$^a$ is a section on the line 15 15 of Fig. 14. Fig. 15 is a section on the line 16 16 of Fig. 14$^a$. Fig. 16 is a section on line 16 16, Fig. 14$^a$, with cylinder X moved.

Similar letters denote similar parts throughout.

A is the bowl of a centrifugal cream-separator; B, the cover having the skim-milk tube $b$ connected with the skim-milk outlet $b'$.

C is the cream-discharge outlet. In the ordinary construction, as is well known, this is a tube screw-threaded on the exterior meshing with a corresponding thread in the wall of the neck of the bowl. In the ordinary construction the portion of the tube, and thus a portion of the cream-discharge outlet may be varied by turning the tube. In the construction now in use in order to change the position of the cream-discharge outlet it is necessary that the machine should be stopped. In the construction shown in Fig. 1 the tube C rests in an orifice in the wall of the neck of the bowl, so as to be readily movable longitudinally or radially in said orifice. Projecting from the tube C is an arm C', to the outer surface of which arm is attached the lever D. The height of the arm C' is such as to bring its outer end in line with the top of the cover, so that the lever D lies flush on the top of the cover. This lever is pivoted at the point d to the top of the bowl.

E is a ring having a circular central orifice, which is set eccentrically upon the top of the bowl and is provided with the slot E', which surrounds the lever D. Projecting from each side of the lever D is a screw which passes through the lever D and is in line with each edge of slot E' of the ring E. As may be seen in the position shown in Fig. 2, the cream-discharge tube C is at a position with its inner mouth farthest from the center of the bowl, in which position the eccentricity of the ring E projects beyond the exterior of the bowl. When it is desired to shift from this position, the operator merely places his finger along the outside of the top of the neck of the bowl, and it will be struck by the projecting portion of the ring E, shifting it to the position shown in Fig. 3, which will in turn shift the lever D to the position shown in Fig. 3, forcing the inner mouth of the cream-discharge tube C closer toward the center. This will shift the exterior of the ring over the opening at the top of the neck of the bowl. To shift it to the position shown in Fig. 2, the operator will then merely place his finger within the inner edge of the top of the neck of the bowl, and the projecting portion of the ring E will be struck by the finger, shifting the ring E, and with it the lever D and the cream-discharge tube C, to the position shown in Fig. 2. By this construction, as may be seen, the operator can vary the position of the cream-discharge orifice, and thus vary the specific gravity or thickness of the cream discharged without stopping the machine. By adjusting the screw $E^2$ the extent of the throw of the lever, and thus the extent of the throw of the cream-discharge tube C, may be varied.

In Fig. 5 I have shown an embodiment of my invention which differs from that shown in the previous figures in that the ring E is replaced by a plate F, which is secured to the lever D and projects from said lever, so that in one position it projects beyond the exterior of the bowl, as shown in Fig. 5, and when struck at that point will force the cream-discharge tube into the position shown in Fig. 3, at which time the end of the plate F will extend beyond the opening in the center of the top of the neck of the bowl, so that when struck at that point it will shift the cream-discharge tube again to the position shown in Fig. 5.

In Fig. 6 I illustrate a construction in which the lever D is replaced by the pin G, which works in a cam-slot $g$ in a ring $E^3$, similar to the ring E of Figs. 2 and 3, and this pin G through the medium of the cam-slot $g$ shifts the cream-discharge tube C in and out. In the construction shown in Figs. 7, 8, and 9 this tube C is fixed in the neck of the bowl and is provided on its inner end with an orificed wedge-shaped piece H, which is adapted to slide vertically in a guide formed on the inner end of the tube C, the orifice $h$ in the piece H corresponding with the orifice in the tube C. As may be seen, by moving this wedge-shaped piece H vertically in one direction the inner edge of the orifice $h$ is brought closer to the center of the bowl, and vice versa, in its movement in the other direction, the orifice being of a length sufficient to allow this movement and yet maintain an opening to the orifice in the tube C. This wedge-shaped piece H is operated in the following manner: The wedge-shaped piece works in guides $h^4$ and is of such height as to project beyond the top of the neck of the cover. In that portion of the piece H which projects beyond the top of the bowl is a slot $h^5$, in which slot rests the cam-plate $h^6$. This cam-plate, as shown in Fig. 9, has two inner faces at the point where it rests in the slot $h^5$. This cam-plate $h^6$ is screwed to a ring $E^4$, similar to the ring $E^3$, Fig. 6. By moving this ring $E^4$ in the same manner as described for the movement of the ring $E^3$ the cam-plate $h^6$ is operated in one direction or the other, lifting or depressing the wedge-piece H and bringing the inner edge of the orifice of the wedge-piece H closer to or farther away from the center of the bowl.

In Figs. 10 and 11 I have shown another modified arrangement in which the cream-discharge tube C has fixed upon it the pin $c$. The exterior of this tube C beyond the pinion $c$ is provided with a coarse thread $c'$, which meshes with the interior of the internally-threaded tube $c^2$. An internal thread on the tube $C^2$ meshes with a thread in the wall of the neck of the cover. The tube C projects through this tube $c^2$ into the interior of the bowl. J is a rack which is connected to the ring $E^5$, similar to ring E, Fig. 1. By the operation of this ring $E^5$ the rack J operates upon the pinion $c$, rotating and moving the tube C closer to or farther away from the center of the bowl, dependent upon which direction the ring E is operated.

In Figs. 12 and 13 I have shown still another construction for moving the cream-outlet tube. In this case the cream-outlet tube C is provided with an inclined inner mouth $c^3$. This tube C has upon it a circular boss K, which is pivoted at $k$ to the wall of the neck of the cover. By rotating this boss upon its pivot or center $k$ the point of the inner mouth $c^3$ of the tube C is brought closer or farther away from the center of the bowl. This boss K revolves upon its pivot or center $k$ by placing a stick or some other object above or below the outer end of the cream-discharge tube C. This will cause the outer end to be either elevated or depressed, dependent upon whether this strikes above or below the outer end of the tube C.

In Figs. 14 to 16 I have shown another form of embodiment of my invention, in which the tube C is screw-threaded and is secured in an orifice $x$ in a vertical cylindrical piece X. Each side of the inner mouth of the orifice $x$ when cylinder X is in the position shown in Fig. 15 is at the same distance from the center of the bowl. When the cylinder is turned, one side of the mouth $x$ is carried farther from the center of the bowl, (see Fig. 16,) carrying the tube C farther from the center of the bowl, and thus varying the thickness of the cream. To operate the cylinder X, I use the following construction: The cylinder X projects through an orifice $y$ in the top of the bowl, fitting snugly therein, but being capable of rotation. Beyond the top of the bowl projecting from the top of cylinder X is the flange Y, provided with the cut-away portion $y'$. $y^2$ is a pin on the top of the bowl resting in this cut-away portion. The interlocking of the pin with the walls of the cut-away portion determines the extent of movement of the cylinder X. During the rotation of the bowl by holding a rod in line of movement of one side or the other of the flange the cylinder will be rotated so as to be dependent upon which side strikes the rod to move the tube C nearer to or farther away from the center of the bowl.

I believe myself to be the first who has provided a construction and mechanism of the cream-discharge device with reference to the center of the bowl which may be varied during the rotation of the bowl, and, speaking generally in reference to my invention, this is accomplished by so supporting the cream-discharge device that it is readily movable to or from the center of the bowl to vary the position of the cream-outlet, and, further, in providing a device or devices connected therewith and rotating with the bowl which when struck by the operator will shift the movable device to or from the center of the bowl. To sum up, I believe, broadly considered, I was the first to devise in a centrifugal separating-machine the combination, with a rotatable bowl, of a cream-discharge device which was movable toward and from the center of the bowl and connected therewith a device which also rotates with the bowl and which was adapted when struck to move said cream device; also in such an arrangement of the bowl and cream-discharge device of means to move said device to or from the center of the bowl and possibly in a more limited sense in such combination with a bowl and cream-discharge device to provide a device connected with the cream-discharge device and movable therewith, said device having surfaces revolving with the bowl at arcs, dependent upon which surface was struck, the cream-discharge device moving in one direction or the other. In this last statement by "different arcs" of course is meant that the arcs may be of different radii or of the same radius; but if of the same radius they are in different planes.

Having now fully described my invention, what I claim, and desire to protect by Letters Patent, is—

1. In a centrifugal cream-separator, the combination with a rotatable bowl, provided with a liquid-discharge-regulating device to regulate the specific gravity of the discharge, of a movable operating device connected therewith, and rotating with the bowl for controlling in its movement the regulating device, said operating device extending exterior of the bowl and adapted to move when, in the rotation of the bowl, it meets an obstruction.

2. In a centrifugal separator, the combination with the rotatable bowl having a movable cream-regulating-discharge device, of a movable operating device connected with the cream-discharge device and rotating with the bowl for adjusting in its movement, the position of said cream-discharge device, the said operating member extending exterior of the bowl and adapted to move when in the rotation of the bowl it meets an obstruction.

3. In a centrifugal separator, the combination with a rotatable bowl having a movable cream-regulating-discharge device, of a movable operating device connected to said cream-regulating-discharge device rotating with the bowl, for adjusting radially the location of the inner end of the cream-discharge device, said regulating device having a portion projecting beyond the surface of the bowl and adapted to move when in the rotation of the bowl it meets an obstruction.

4. In a centrifugal separator, the combination with a rotatable bowl having a movable cream-regulating-discharge device, of a movable operating device, connected with the cream-regulating-discharge device and rotating with the bowl, adapted in its movement to vary the radial location of the inner end of the cream-discharge device, there being a portion of said operating device projecting beyond the bowl and having the opposite sides of said projecting portion free, whereby in the rotation of said bowl when said projecting portion strikes an obstruction it moves and the direction of its movement is determined by the side struck.

5. A discharge-tube for a centrifugal cream-separator, the inner end of which is freely movable to vary its radial position and a movable device rotating with the bowl connected with said tube and projecting beyond the wall of the bowl.

6. In a centrifugal separator, the combination with a rotatable bowl, of an open cream-discharge tube freely mounted and movable on a vertical axis so that the inner end of said tube may reciprocate, and by such reciprocation vary the radial position of the inner end of said tube.

7. In a centrifugal separator, the combination, with a rotatable bowl, of an open cream-discharge tube freely mounted and movable on an axis so that the inner end of said tube may reciprocate, and by such reciprocation vary the radial position of the inner end of said tube, and means beyond the wall of the bowl adapted when struck to move said tube.

8. In a centrifugal separator, the combination with a rotatable bowl, of an open cream-discharge tube freely mounted and movable on a vertical axis so that the inner end of said tube may reciprocate, and by such reciprocation vary the radial position of the inner end of said tube, and means beyond the wall of the bowl adapted when struck to move said tube.

9. In a centrifugal cream-separator, the combination, with a rotatable bowl, of an open cream-discharge device mounted in the neck of the bowl so as to be capable of rotating on a vertical axis therein and thus move toward or from the center of the bowl, and a flange mounted on the axis of the cream-discharge device and rotating therewith and overlying the upper surface of the neck of the bowl.

10. In a centrifugal cream-separator, the combination, with a rotatable bowl, of a cream-discharge device mounted in the neck of the bowl so as to be capable of rotating on a vertical axis therein and thus move toward or from the center of the bowl, and a flange mounted on the axis of the cream-discharge device and rotating therewith and overlying the upper surface of the neck of the bowl, said flange extending beyond the axis of the cream-discharge device toward the inner and outer periphery of the bowl, whereby the flange may be moved during the rotation of the bowl to swing said cream-discharge device in either direction.

11. In a centrifugal cream-separator, the combination, with a rotatable bowl, of a cream-discharge device mounted in the neck of the bowl so as to be capable of rotating on a vertical axis therein and thus move toward or from the center of the bowl, and a flange mounted on the axis of the cream-discharge device and rotating therewith and overlying the upper surface of the neck of the bowl, said flange extending beyond the axis of the cream-discharge device toward the inner and outer periphery of the bowl, whereby the flange may be moved during the rotation of the bowl to swing said cream-discharge device in either direction, and a stop on the top of the neck engaging the flange, when the same is swung in either direction, to limit its extent of rotation.

12. In a centrifugal cream-separator, the combination, with the tube C, of a cylindrical piece X in which said tube is secured, said piece X being mounted on a vertical axis in the neck of the bowl and extending to the upper surface of the neck, a flange overlying the neck and connected to the piece X so as to rotate therewith, and a stop on the neck engaging said flange and limiting its rotation and the rotation of the piece X.

In testimony of which invention I have hereunto set my hand, at Avon, New York, on this 26th day of December, 1899.

JOHN JOSEPH BERRIGAN.

Witnesses:
AUSTIN J. TRIPP,
JOHN L. WESTFALL.